US010665039B2

(12) United States Patent
Remboski et al.

(10) Patent No.: US 10,665,039 B2
(45) Date of Patent: May 26, 2020

(54) DISTRIBUTED MONITORING AND CONTROL OF A VEHICLE

(71) Applicant: Traffilog Ltd., Rosh Haayin (IL)

(72) Inventors: Donald James Remboski, Ann Arbor, MI (US); Jacqueline A. Dedo, Wolverine Lake, MI (US); Dani Shafriri, Rosh-Haayin (IL); Asi Biton, Rosh-Haayin (IL); Arik Greenberger, Rosh-Haayin (IL)

(73) Assignee: Traffilog Ltd., Rosh-Haayin (IL)

( * ) Notice: Subject to any disclaimer, the term of this patent is extended or adjusted under 35 U.S.C. 154(b) by 282 days.

(21) Appl. No.: 15/836,967

(22) Filed: Dec. 11, 2017

(65) Prior Publication Data

US 2018/0257664 A1   Sep. 13, 2018

Related U.S. Application Data

(60) Provisional application No. 62/431,919, filed on Dec. 9, 2016, provisional application No. 62/431,906, filed on Dec. 9, 2016.

(51) Int. Cl.
*G07C 5/08* (2006.01)
*H04L 29/08* (2006.01)
(Continued)

(52) U.S. Cl.
CPC ....... *G07C 5/0808* (2013.01); *B60W 50/0097* (2013.01); *B60W 50/0205* (2013.01); *B60W 50/045* (2013.01); *B60W 50/14* (2013.01); *H04L 67/125* (2013.01); *B60W 2050/0037* (2013.01); *B60W 2050/0077* (2013.01);
(Continued)

(58) Field of Classification Search
CPC ...... G07C 5/0808; G07C 5/085; G07C 5/008; H04L 67/125; B60W 50/0205; B60W 50/0097; B60W 50/14; B60W 50/045; B60W 2050/0082; B60W 2050/0037; B60W 2050/0077; B60W 2050/0089; B60W 2050/0088; B60W 2050/021; B60W 2050/046; G06N 20/00
USPC ...................................................... 701/1, 36
See application file for complete search history.

(56) References Cited

U.S. PATENT DOCUMENTS

| 8,140,358 B1 * | 3/2012 | Ling ..................... G06Q 40/08 705/4 |
| 9,720,415 B2 * | 8/2017 | Levinson ................ G01S 13/86 |

(Continued)

*Primary Examiner* — Jaime Figueroa
(74) *Attorney, Agent, or Firm* — Reches Patent

(57) ABSTRACT

A distributed system for monitoring and control of a vehicle includes a supervisory controller with a first computer readable storage media for monitoring and storing a plurality of operational parameters regarding a physical system of the vehicle. The supervisory controller communicates with a server via two different communications networks. Method steps are provided for characterizing and predicting functional details of a system state of the physical system using the model parameters and at least one operational parameter of the physical system, and for using values obtained by the server regarding a plurality of different vehicles in order to improve the monitoring and control of the vehicle. A method is also provided to determine and report any operational parameters miss a corresponding performance target. A method is also provided for changing the storage or transmission of operational parameters based on their relative importance.

20 Claims, 13 Drawing Sheets

(51) Int. Cl.
  B60W 50/02 (2012.01)
  B60W 50/14 (2020.01)
  B60W 50/04 (2006.01)
  B60W 50/00 (2006.01)
  G06N 20/00 (2019.01)
  G07C 5/00 (2006.01)

(52) U.S. Cl.
  CPC ............... *B60W 2050/0082* (2013.01); *B60W 2050/0088* (2013.01); *B60W 2050/0089* (2013.01); *B60W 2050/021* (2013.01); *B60W 2050/046* (2013.01); *G06N 20/00* (2019.01); *G07C 5/008* (2013.01); *G07C 5/085* (2013.01)

(56) References Cited

U.S. PATENT DOCUMENTS

| | | | |
|---|---|---|---|
| 9,958,864 B2 * | 5/2018 | Kentley-Klay | G01S 17/87 |
| 10,361,802 B1 * | 7/2019 | Hoffberg-Borghesani | H04N 5/782 |
| 2003/0184307 A1 * | 10/2003 | Kozlowski | B60L 3/0046 |
| | | | 324/427 |
| 2004/0039527 A1 * | 2/2004 | McDonald, Jr. | G01S 5/0027 |
| | | | 701/469 |
| 2005/0137757 A1 * | 6/2005 | Phelan | G01M 17/00 |
| | | | 701/1 |
| 2009/0234521 A1 * | 9/2009 | Kumar | B60L 11/1851 |
| | | | 701/19 |
| 2013/0338855 A1 * | 12/2013 | Mason | G07C 5/0816 |
| | | | 701/2 |
| 2014/0257624 A1 * | 9/2014 | Safa-Bakhsh | G06F 17/00 |
| | | | 701/31.4 |
| 2015/0161893 A1 * | 6/2015 | Duncan | G07C 5/008 |
| | | | 701/1 |
| 2015/0228129 A1 * | 8/2015 | Cox | G07C 5/0808 |
| | | | 701/29.1 |
| 2015/0232097 A1 * | 8/2015 | Luther | B61L 3/006 |
| | | | 701/123 |
| 2015/0298684 A1 * | 10/2015 | Schwartz | B60W 10/10 |
| | | | 701/22 |
| 2018/0060738 A1 * | 3/2018 | Achin | G06Q 10/04 |

* cited by examiner

DISTRIBUTED MONITORING AND CONTROL OF A VEHICLE

CROSS REFERENCE TO RELATED APPLICATION

Utility patent application claims the benefit of U.S. Provisional Patent Application Ser. No. 62/431,919 and No. 62/431,906 both filed Dec. 9, 2016—both are hereby incorporated by reference in its entirety.

BACKGROUND OF THE INVENTION

1. Field of the Invention

A system and method for distributed monitoring and control of physical systems within a vehicle is provided.

2. Description of the Prior Art

Several different systems and methods for distributed monitoring and control of physical systems within a vehicle exist today. Such telemetric systems use different techniques for minimizing the amount of data transferred between a vehicle and a server. Some techniques in use today include using a restricted set of data, simple thresholds on that data (e.g. a geofence) and/or manual intervention to discover events of interest in the vehicle. However, each of those techniques has associated drawbacks that can prevent potentially useful data from being captured.

Model-based monitoring and control systems and methods for distributed monitoring and control of physical systems within a vehicle also exist today. However, such model-based monitoring and control systems have several drawbacks. For example, Model-based monitoring and control systems often fail when confronted with an operating situation outside the area anticipated in the system's design. These traditional methods can only spot overall trends and often not the underlying reasons for the overall trends in monitoring or control performance.

Current solutions often fail to identify particular circumstances that lead to performance problems. Furthermore, vehicle system performance feedback is traditionally gathered by warranty information, loss data and other long-delay methods. Telematics systems on some vehicles gather overall use information and relate this to bulk parameters such as total fuel consumed. These methods are used for product improvement, but not for model-base monitoring or control improvement.

Current systems and methods also rely on preset (a-priori) choices for parameters to monitor, models used for sensor fusion and parameter estimation, data reduction before transmission, data transmission methods and timing, partitioning between local on-vehicle computing/data storage versus cloud computing/data storage and many other aspects of the telemetry/telematics system. These a-priori choices result in missed opportunities to correctly understand machine state given limits to the amount of data that can be cost-effectively transmitted across cellular data connections. Changes in data-handling choices typically require upgrading hardware or re-flashing software.

There exists a need to improve the performance of model-based monitoring and control systems in vehicles over variances in the vehicle or its operating environment that are hard to predict and sometimes only observable in the field. There also exists needs to optimize and parameters to be monitored and communicated within a vehicle monitoring and control system to optimally use different communications networks by dynamically tuning the above listed categories to get the most valuable information for the lowest costs on an operator by operator basis and a machine by machine basis.

SUMMARY OF THE INVENTION

The invention provides for a first method for monitoring and control of a vehicle including providing a functional model with a plurality of model parameters to simulate a physical system within the vehicle. The first method proceeds with the step of calibrating the model parameters by the supervisory controller using measured values from one or more sensors; and storing the model parameters in a model store area of memory within a first computer readable storage media of a supervisory controller located in the vehicle. The first method also includes characterizing functional details of the current system state of the physical system within the vehicle by the supervisory controller using the model parameters and at least one operational parameter of the physical system; and predicting future states of the physical system within the vehicle by the supervisory controller using the model parameters and measured values from one or more sensors. The first method concludes with the steps of estimating by the supervisory controller system state values of interest of the physical system within the vehicle and not directly measured by any of the sensors using the model parameters together with at least one operational parameter of the physical system; detecting events of interest by the supervisory controller within the system states of the functional model; and transmitting by the supervisory controller data regarding detected events of interest to a server located remotely from the vehicle.

The invention provides for a second method for monitoring and control of a vehicle having a plurality of control modules and a supervisory controller. The method includes setting by a server located remotely from the vehicle a performance target associated with an operational parameter of a physical system of the vehicle. The second method includes transmitting the performance target from the server to the supervisory controller; the performance target defining allowable errors in the value of the operational parameter based on overall system performance or safety. The second method also includes designating by the supervisory controller a working area of memory within first computer readable storage media of the supervisory controller for storing an operational parameter holding a value of a process variable or a value of a control variable associated with the vehicle; and comparing by the supervisory controller the operational parameter with the performance target to determine if the operational parameter is a missed target. The second method proceeds with the step of sending additional data of additional parameters related to the missed target by the supervisory controller to the server in response to a missed target. The additional parameters related to the missed target includes one or more of: measured or inferred operational parameters, data regarding operating conditions, driver identification, type of vehicle, location and/or route data. The second method concludes with the steps of analyzing by the server data regarding missed targets from a plurality of vehicles having similar or identical hardware configurations; and determining by the server correlations between the missed target and one or more of the additional parameters related to the missed target using the additional data regarding missed targets from a plurality of vehicles having similar or identical hardware configurations, and producing a correlation report of potential correlated parameters.

The invention also provides for a third method for monitoring and control of a vehicle having a plurality of control modules and a supervisory controller. The third method includes storing by the supervisory controller a plurality of operational parameter values, each from a different time, as historical data in a data store area of a first computer readable storage media. The third method also includes transmitting by the supervisory controller, the historical data to a server located remotely from the vehicle via one or more communications channels each having corresponding costs, bandwidth and operating range; and determining by the supervisory controller the relative importance of an operational parameter in relation to the costs of collecting, processing, transmitting, and storing the associated historical data, and assigning an importance value thereto in relation to the benefits in improving driver or machine behavior. The third method concludes with the step of changing by the supervisory controller one of the storing or the transmitting of the historical data in response to the relative importance of the associated operational parameter.

The provided methods for distributed monitoring and control of a vehicle may provide several advantages over long-delay methods of the prior art, such as using loss data such as warranty reports to determine problems with newly deployed systems. Such loss data may require two quarters (half a year) to pass before a manufacturer is made aware of a systemic problem with a production system or part. In other words, the subject distributed system allows for the prediction of problems before they cause failures. For example, a distributed system can verify the performance of a braking system by comparing the pressure within a brake system against vehicle deceleration. In this way, the system can avoid catastrophic failures and can allow for production parts to be revised at an earlier date than would be possible using only loss data. Both of these changes can present substantial savings to a manufacturer of vehicles.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a distributed system 20 for monitoring and control of a vehicle 22 is provided. As provided in FIGS. 1-2, the distributed system 20 includes a plurality of physical systems 24 within the vehicle 22. The physical systems 24 may include, for example, an engine, transmission, brakes, transfer case, chassis electrical, infotainment, heating, ventilation, and air conditioning (HVAC). The distributed system 20 also includes a plurality of subsystems within the vehicle 22, such as, for example, a coolant circulation loop or a charge air system providing fresh air to the engine, or a compressor loop of an air conditioning system.

Figure 1:
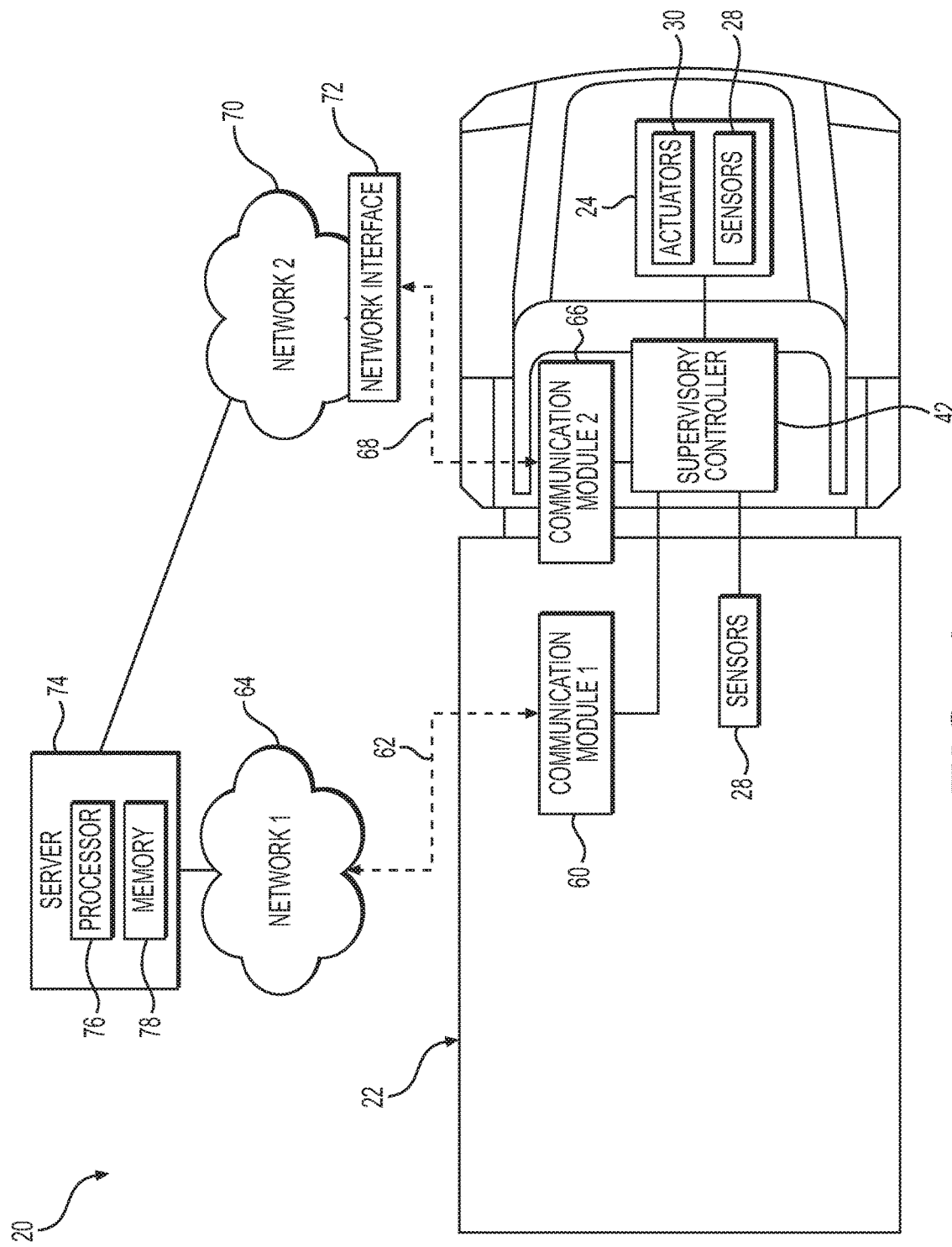
FIG. 1 is a block diagram of a distributed system for monitoring and control of a vehicle.

As shown in FIG. 1, a plurality of sensors 28, are also provided, with each of the sensors 28 measuring one or more physical properties on the vehicle 22. The sensors 28 may be associated with one or more of the physical systems 24 and/or the subsystems within the vehicle 22. The sensors 28 may alternatively monitor a parameter that is independent of the physical systems 24 and subsystems of the vehicle 22. A plurality of actuators 30 are also provided, with each of the actuators 30 causing one or more mechanical actions in response to a command signal 32 from a control module 34. The actuators 30 may for example, control power doors or locks, the position of the throttle in a drive-by-wire system, or the use of different gears in an automatic transmission. The control module 34 may be, for example, an engine control unit (ECU) or a transmission control unit (TCU) or a body control unit (BCU).

Figure 2:
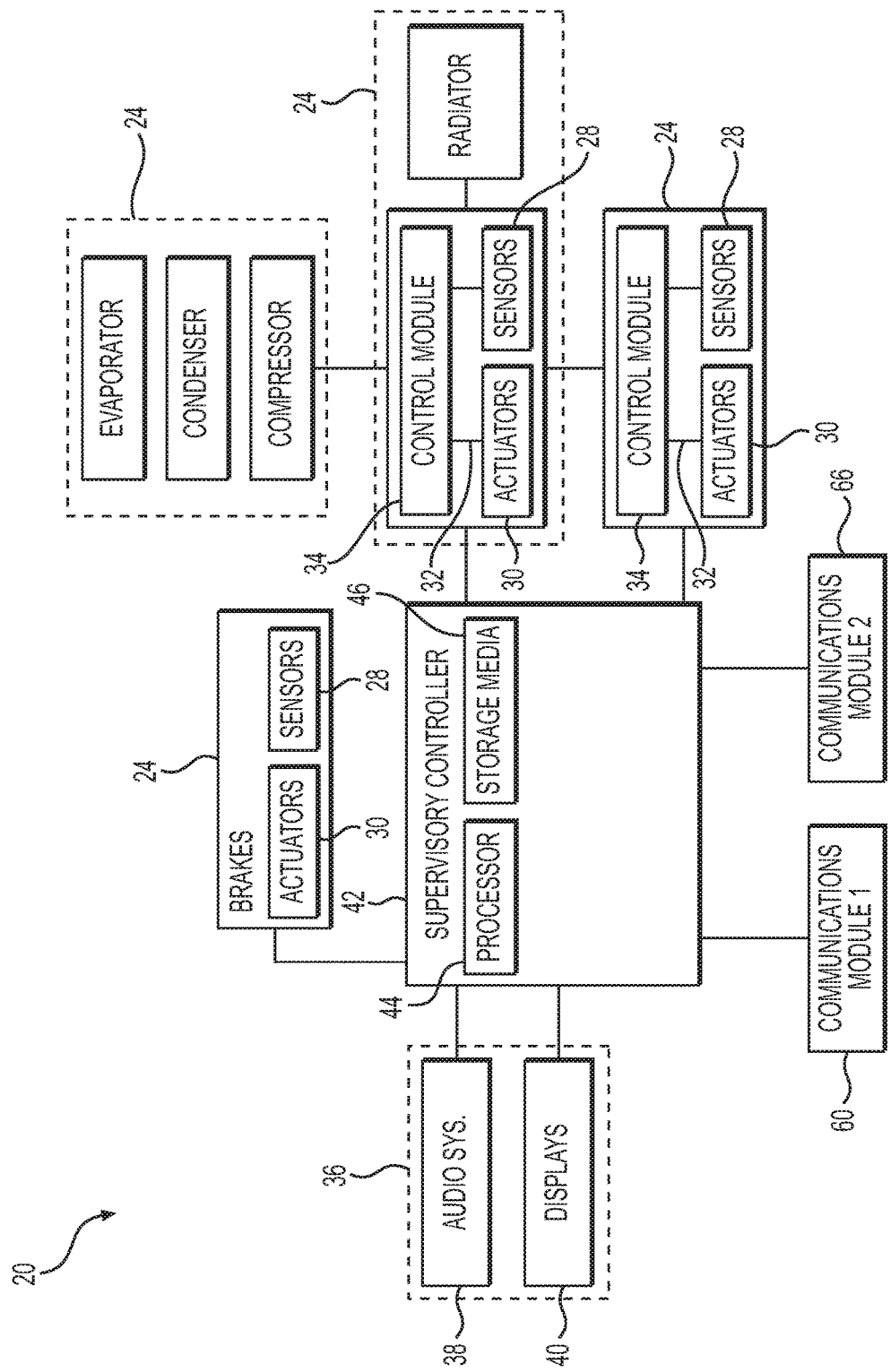
FIG. 2 is a block diagram of a distributed system for monitoring and control of a vehicle.

As shown in FIG. 2, the distributed system 20 includes a user signaling device 36, which may include an audio signaling device 38 and/or a visual signaling device 40 for providing a corresponding signal to a driver of the vehicle 22. For example, an audio signaling device 38 may include a stand-alone buzzer or speakers of an audio or infotainment system in the vehicle 22 configured to play a predetermined sound such as a chime or tone. The visual signaling device 40 may include a telltale type warning light, or one or more graphic indicators on a display screen such as on an infotainment system or in a driver information screen of an instrument cluster in the vehicle 22. Furthermore, the visual signaling device 40 may include a plurality of different indicators to show the relative quality of an action or a quantity of some other variable. One example of such a visual signaling device 40 is the D-MAS (Driver Maneuver Awareness System) by Traffilog Fleet Management Solutions, which includes a cluster mounted on the dashboard of the vehicle 22 with several different colored lights, and which is used to notify the driver in real time of any unsafe or inefficient maneuvers that they have conducted.

As shown in FIGS. 1-2, the distributed system 20 includes a supervisory controller 42 located in the vehicle 22. The supervisory controller 42 includes a first processor 44 and a first computer readable storage media 46 and is in communication with the sensors 28 and the actuators 30. The supervisory controller 42 is also in communication with the user signaling device 36 for providing feedback to a driver of the vehicle 22.

Figure 4:
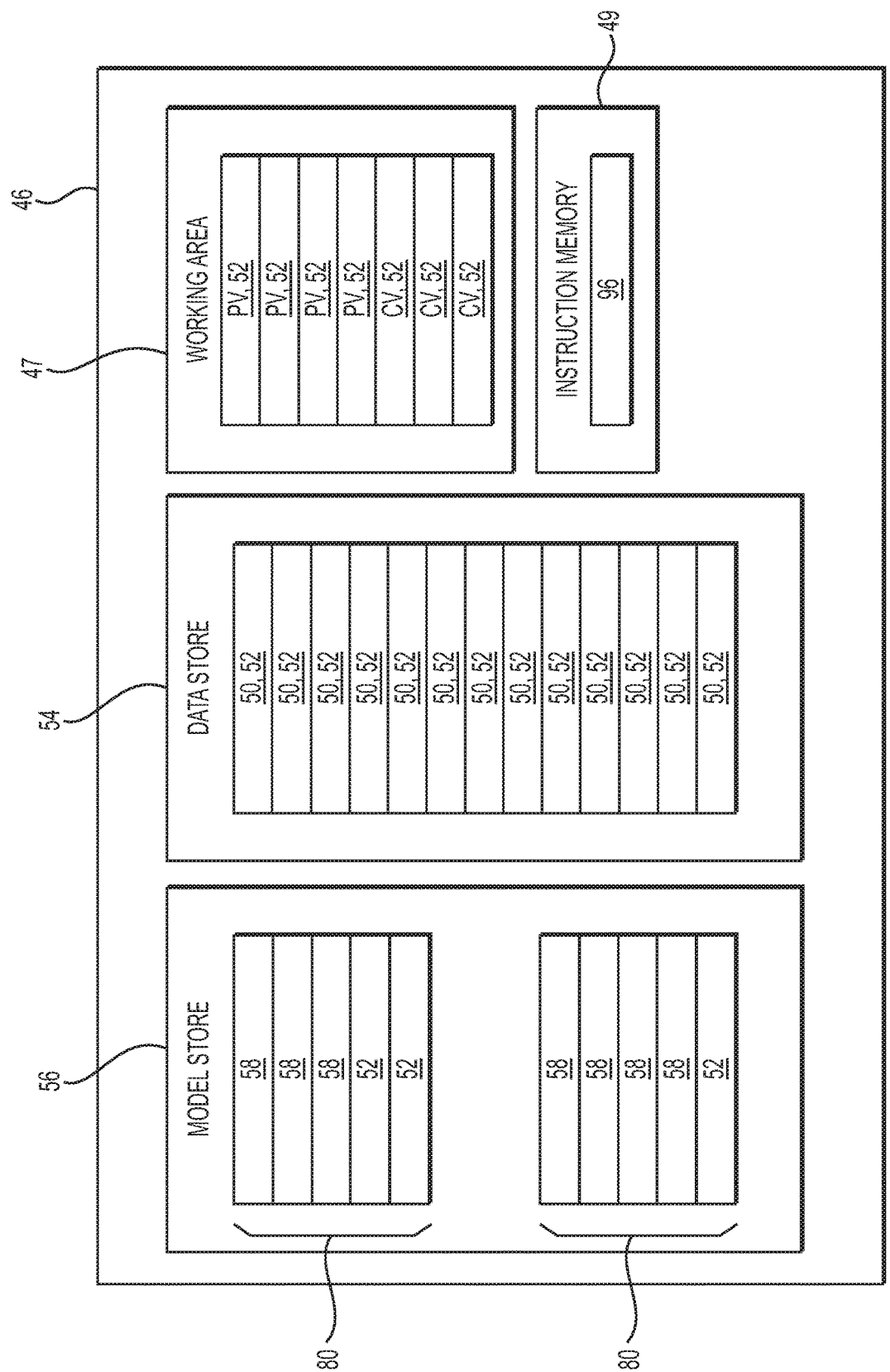
FIG. 4 is a block diagram of a first computer readable storage media within the supervisory controller.

As shown in FIG. 4, the first computer readable storage media 46 of the supervisory controller 42 includes a working area 47 of memory holding plurality of operational parameters 52 which are monitored by the distributed system 20. The operational parameters 52 include both process variables PV and control variables CV. Each process variable PV is a numeric representation of a physical property of a physical system 24, such as, for example, a quantity measured by one of the sensors 28. Each control variable CV is a numeric representation of a commanded output, such as the command signal 32 to one of the actuators 30. The operational parameters 52 may also include data regarding weather and other environmental factors such as lighting conditions, humidity, visibility, etc. that the vehicle 22 experiences, terrain and roadway data, and route data. The first computer readable storage media 46 of the supervisory controller 42 includes an instruction memory 49 holding machine readable instructions for execution by the first processor 44. The machine readable instructions within the instruction memory 49 may be any type of machine readable instructions such as compiled or interpreted program code.

Figure 3:
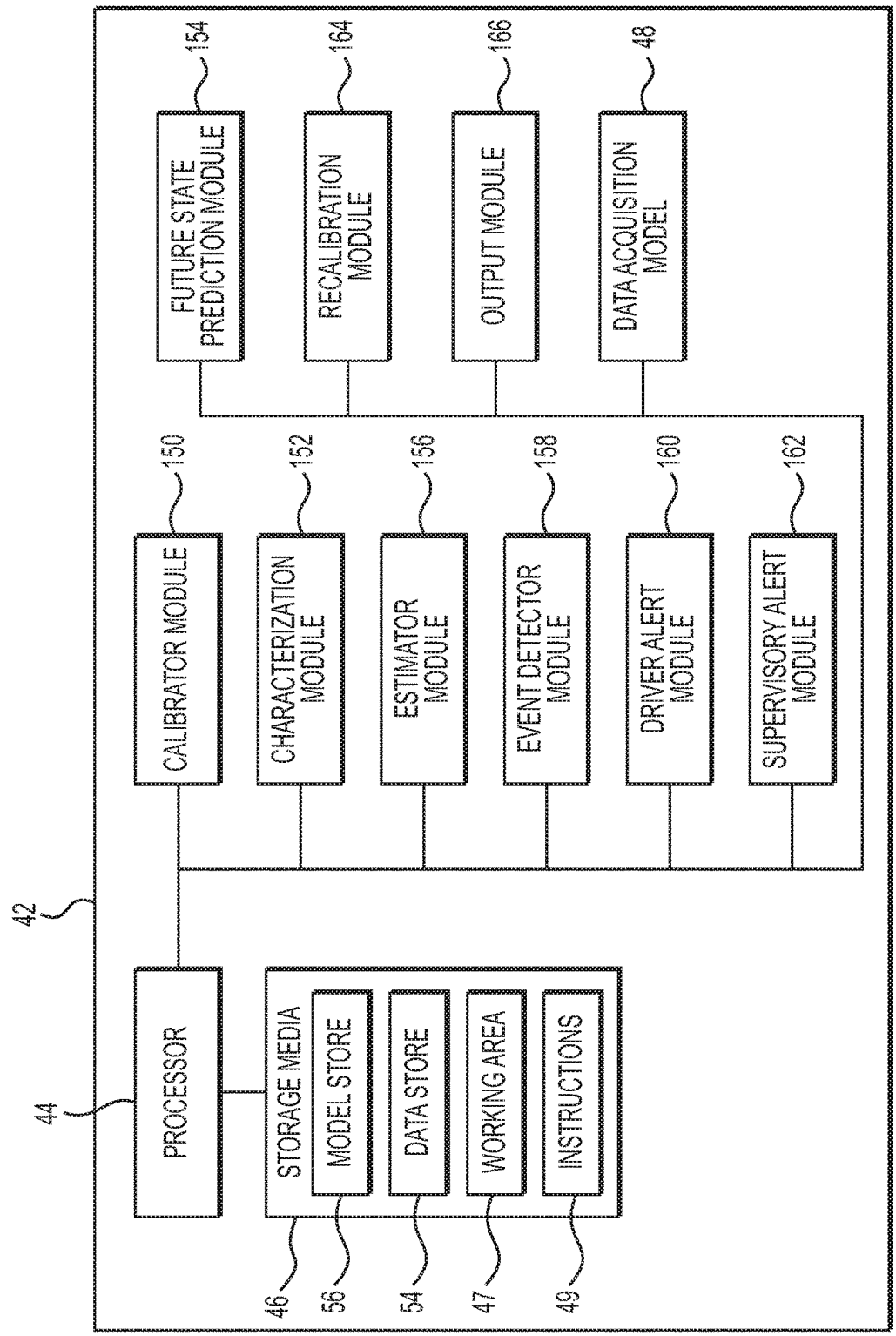
FIG. 3 is a block diagram of a supervisory controller of the distributed system for monitoring and control of a vehicle.

As shown in FIG. 3, the supervisory controller 42 includes a data acquisition module 48 for storing historical data 50 of one or more of the operational parameters 52 in a data store 54 portion of the first computer readable storage media 46. In other words, the data store 54 includes historical data 50 with several different values of given ones of the operational parameters 52 from different times. Each historical data 50 item may include a value of an associated operational parameters 52 together with a time and/or date stamp of when that value was recorded. This historical data 50 allows, for example, the supervisory controller 42 to determine information regarding how the given ones of the operational parameters 52 change over time. The supervisory controller 42 also includes a model store 56 portion of the first computer readable storage media 46 holding data related to a plurality of model parameters 58 together characterizing a given aspect of one of the physical systems 24 and/or subsystems of the vehicle 22.

As shown in FIG. 1, the distributed system 20 includes a first communications module 60 in communication with the supervisory controller 42 for communicating data between the vehicle 22 and one or more devices located externally of the vehicle 22 using a first communications channel 62 including a distributed data network 64 capable of operating over a wide area. The first communications module 60 may include, for example, a cellular or wireless data modem or a satellite communications interface. The distributed system 20 also includes a second communications module 66 in communication with the supervisory controller 42 for communicating data between the vehicle 22 and the one or more devices located externally of the vehicle 22 using a second communications channel 68 including local data network 70 requiring the vehicle 22 to be proximate to a network interface 72 of the local data network 70. The second communications module 66 may include, for example a wired or local area wireless data connection such as Bluetooth or Wi-Fi. Furthermore, each of the different data networks 64, 70 have an associated cost of use, bandwidth, and operating range. For example, use of the first data network may require a fixed and/or per-unit of data cost to be paid to the operator of the distributed data network 64. The local data network 70 may have a lower cost of use (or no cost except for the cost of equipment); however, the local data network 70 data network may only be available in certain situations, such as when the vehicle 22 is located proximate to the network interface 72 of the local data network 70. The local data network 70 may be best used, for example, for transferring large quantities of data that is not time-sensitive. Examples of such large quantities of data may be a nightly dump of historical data 50 or a software update for a controller on the vehicle 22.

As shown in FIG. 1, the distributed system 20 includes a server 74 located remotely from the vehicle 22. The server 74 includes a second processor 76 and a second computer readable storage media 78 and is in regular communications with the supervisory controller 42 via at least one of the data networks 64, 70. In other words, the one or more devices located externally of the vehicle 22 that the supervisory controller 42 communicates with may include the server 74. The server 74 is also in regular communications with a plurality of other vehicles 22 each including at least one component similar or identical to one of the physical systems 24 (e.g. vehicles 22 having the same mode of engine and/or transmission).

Figure 7:
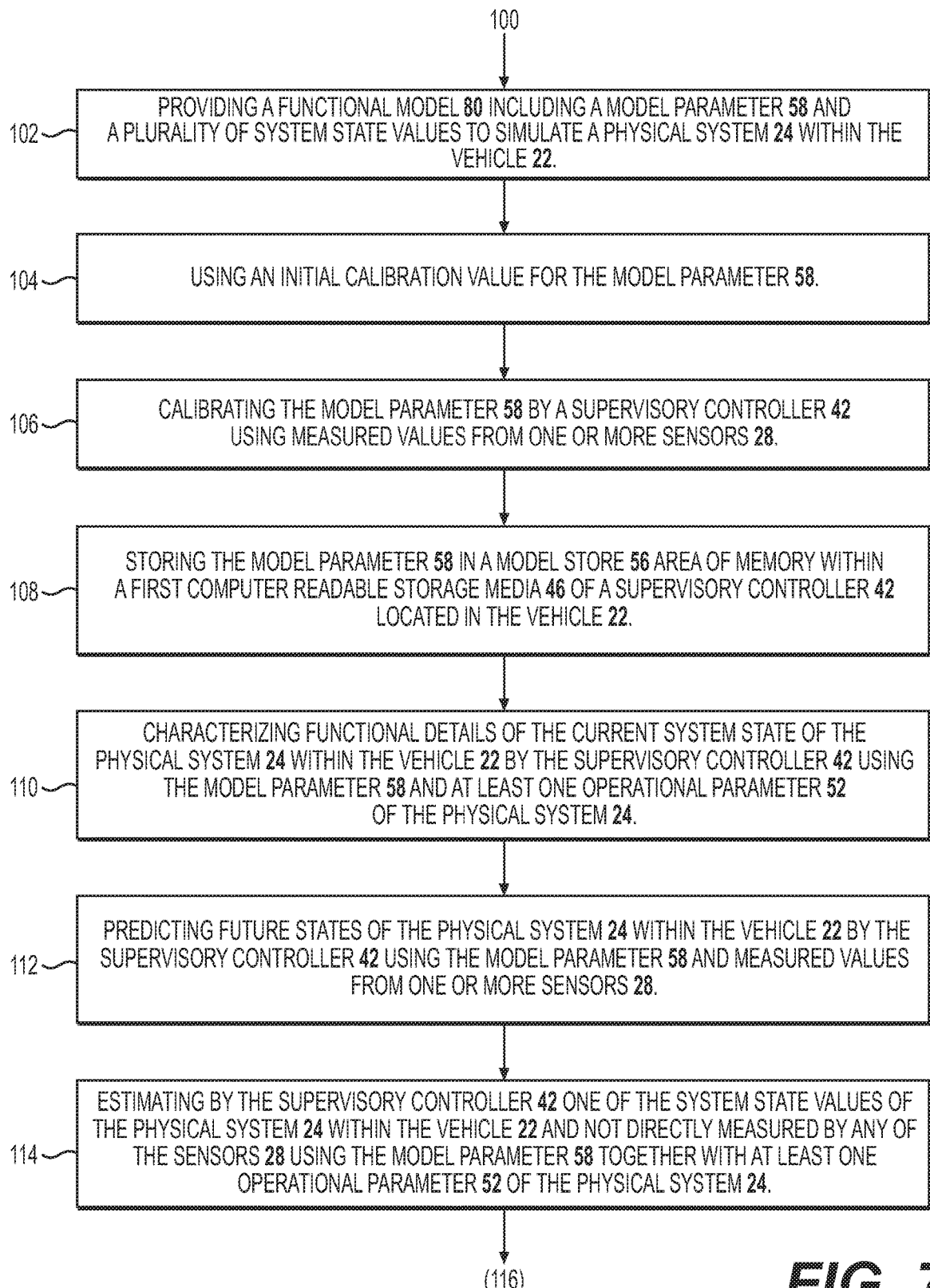
FIG. 7 is a flow chart illustrating method steps of an embodiment for monitoring and control of a vehicle according to an aspect of the disclosure.
Figure 8:
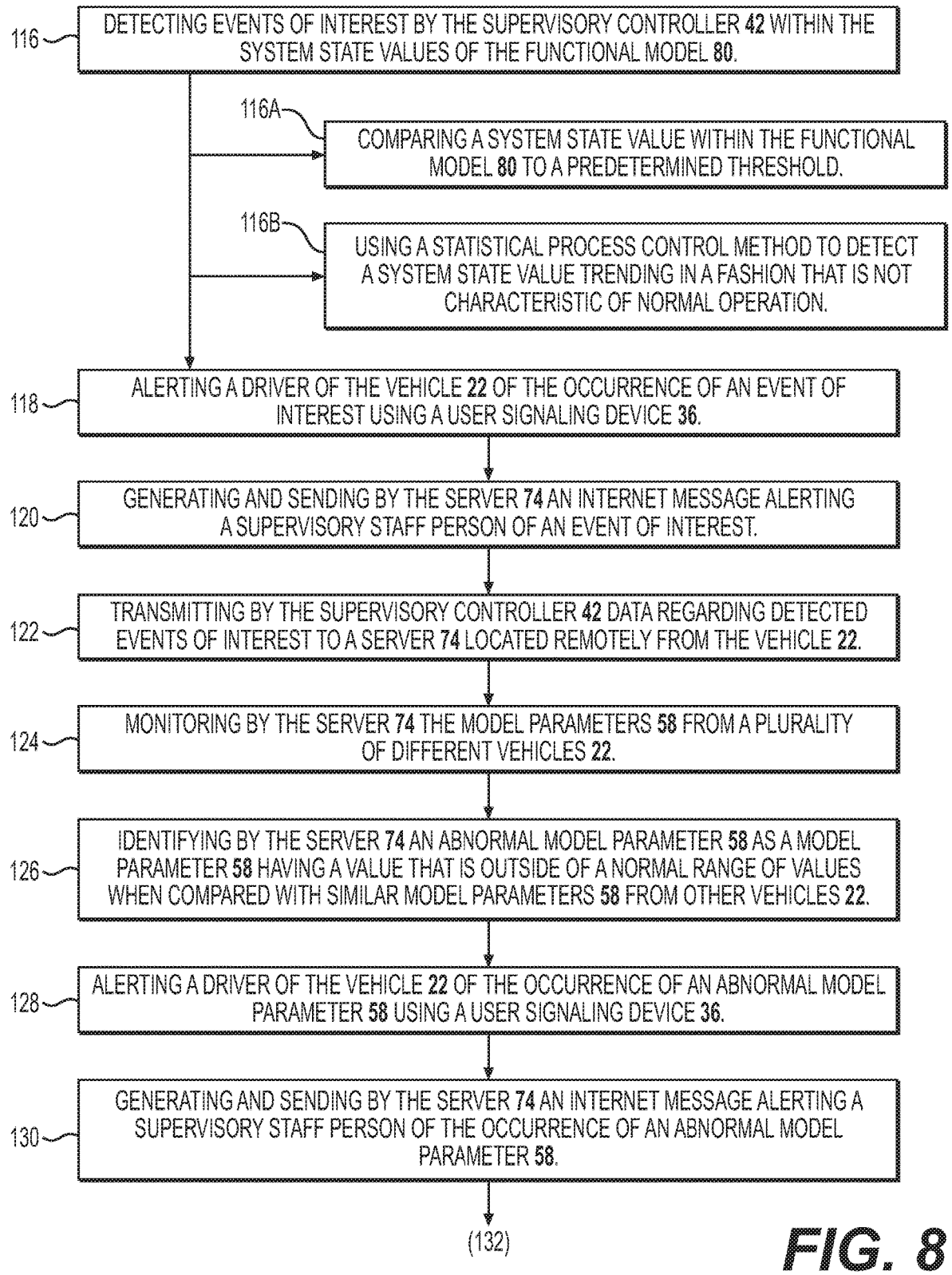
FIG. 8 is a flow chart illustrating method steps.
Figure 9:
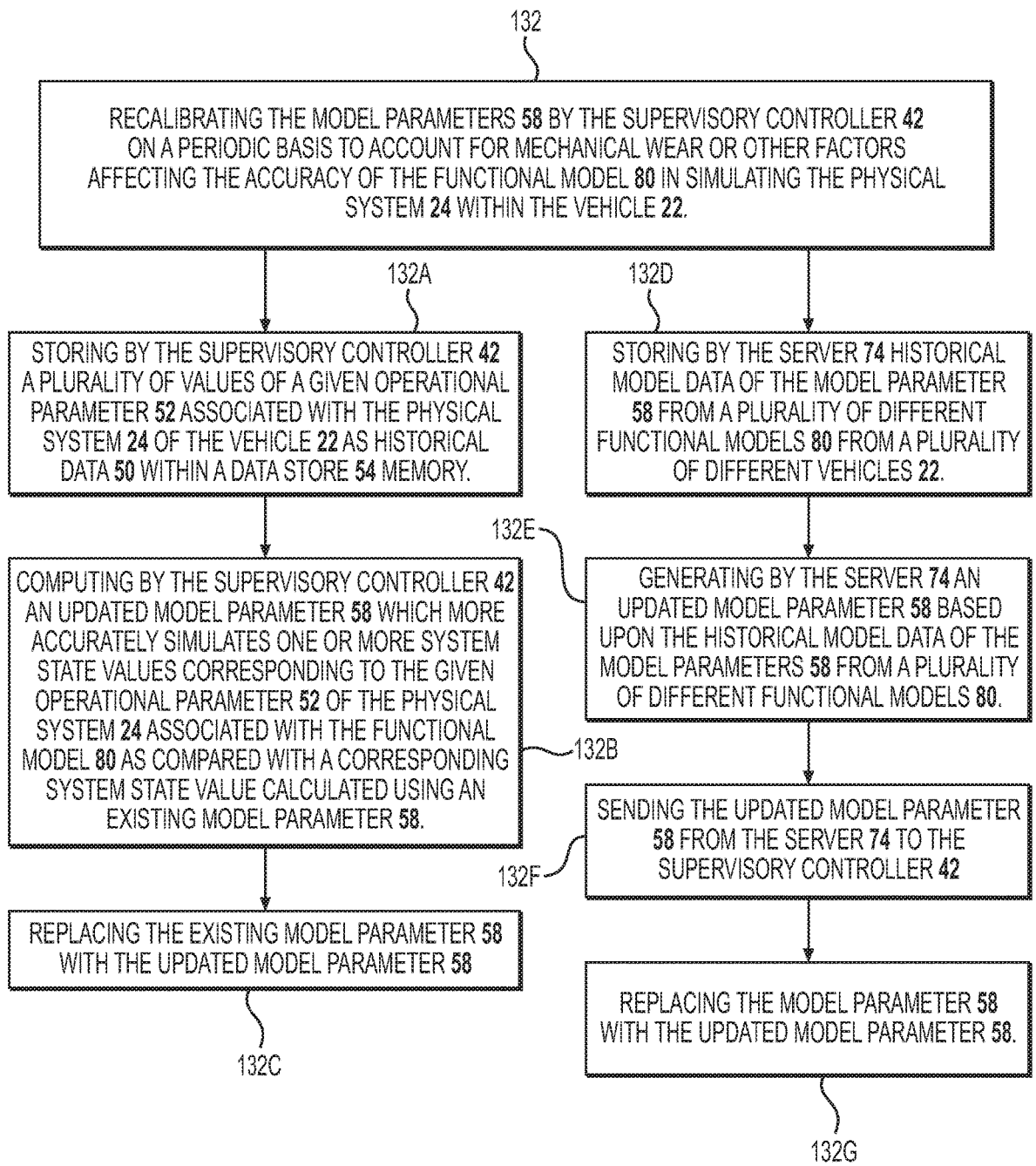
FIG. 9 is a flow chart illustrating method steps.

The present disclosure also includes a first method 100 for monitoring and control of a vehicle 22. The first method 100 is described in the flow charts of FIGS. 7-9. The first method 100 includes the step of 102 providing a functional model 80 including a model parameter 58 to simulate a physical system 24 within the vehicle 22. The functional model 80 may include a plurality of two or more model parameters 58. The functional model 80 may be, for example, a computer executed simulation of an engine cooling subsystem. In that example, the model parameters 58 may include the flow rate of coolant, the efficiency of a radiator in the engine cooling subsystem. In practice, the functional model 80 may be much more complex, including several additional model parameters 58 for things such as load, air density, heat transfer coefficient, water flow restrictions, etc. The functional model 80 may also require the use of one or more operational parameters 52, which may be measured directly or indirectly, such as, for example, coolant temperature and ambient air temperature.

The first method 100 may include the step of 104 using an initial calibration value for the model parameter 58. The initial calibration value may come from, for example, engineering estimates, or from baseline data from another source such as other vehicles 22 or from data produced while testing the associated physical system 24.

The first method 100 also includes 106 calibrating the model parameter 58 by the supervisory controller 42 using measured values from one or more sensors 28. As shown in FIG. 2, a calibrator module 150 within the supervisory controller 42 may perform this step. The calibrator module 150 may include hardware, software, or a combination thereof. These calibrated model parameters 58 would replace corresponding initial calibration values after a predetermined period of time or after the occurrence of some condition. For example, the supervisory controller 42 may use the measured values of the coolant temperature, and the ambient air temperature, together with a known or estimated value of the coolant flow to determine a calibration value of the radiator efficiency model parameter 58. The measured values may always be used for calibrating the model parameters 58. Alternatively, the measured values may be used only after a predetermined period of time or after the occurrence of a condition such as, for example, when the coolant temperature has reached a predetermined warmup temperature.

The first method 100 also includes the step of 108 storing the model parameters 58 in a model store 56 area of memory within a first computer readable storage media 46 of a supervisory controller 42 located in the vehicle 22.

The first method 100 also includes the step of 110 characterizing functional details of the current system state of the physical system 24 within the vehicle 22 by the supervisory controller 42 using the model parameters 58 and at least one operational parameter 52 of the physical system 24. The operational parameters 52 may include process variables PV or control variables CV. The operational parameters 52 may also include other data regarding environmental factors experienced by the vehicle 22 such as, for example, weather data, lighting conditions, humidity, visibility, terrain and/or roadway data, and route data. As shown in FIG. 2, a characterization module 152 within the supervisory controller 42 may perform this step. The characterization module 152 may include hardware, software, or a combination thereof.

The first method 100 also includes the step of 112 predicting future states of the physical system 24 within the vehicle 22 by the supervisory controller 42 using the model parameters 58 and measured values from one or more sensors 28. As shown in FIG. 2, a future state prediction module 154 within the supervisory controller 42 may perform this step. The future state prediction module 154 may include hardware, software, or a combination thereof.

The first method 100 also includes the step of 114 estimating by the supervisory controller 42 system state values of interest of the physical system 24 within the vehicle 22 and not directly measured by any of the sensors 28 using the model parameters 58 together with at least one operational parameter 52 of the physical system 24. The system state values of interest may be any of the operational parameters 52 or a value calculated using one or more of the operational parameters 52. As shown in FIG. 2, an estimator module 156 within the supervisory controller 42 may perform this step. The estimator module 156 may include hardware, software, or a combination thereof.

The first method 100 also includes the step of 116 detecting events of interest by the supervisory controller 42 within the system states of the functional model 80. As shown in FIG. 2, an event detector module 158 within the supervisory controller 42 may perform this step. The event detector module 158 may include hardware, software, or a combination thereof. Events of interest may be detected based on two or more different operational parameters 52, which are each measured directly. For example, the event detector module 158 may detect an increasing coolant temperature during steady-state driving (e.g. after warm-up is complete), and also a decreasing battery voltage at the same time. The event detector module 158 may then recognize those otherwise independent operational parameters 52 as being likely caused by a common underlying event of interest. In this case, the likely common event of interest is a slipping fan belt that causes both the alternator and the cooling fan to turn more slowly. Step 116 may include the sub-steps of: 116A comparing one of the system state values within the functional model 80 to a predetermined threshold; and/or 116B using a statistical process control method to detect one or more of the system state values trending in a fashion that is not characteristic of normal operation. Step 116 may also be applied to two or more of the system state value, such as in the example above related to two or more different operational parameters 52 that together signify an events of interest, The first method 100 may include the step of 118 alerting a driver of the vehicle 22 of the occurrence of an event of interest using a user signaling device 36. As shown in FIG. 2, a driver alert module 160 within the supervisory controller 42 may perform this step, in total or in part. The driver alert module 160 may include hardware, software, or a combination thereof. For example, the driver alert module 160 may cause the first processor 44 of the supervisory controller 42 to communicate a warning alert message to the driver by sending a signal to a user signaling device 36, which may inform the driver of the event of interest, and which may allow the driver to take a corrective action or to change behavior to prevent similar events of interest from occurring in the future. The first method 100 may also include the optional step of 120 generating and sending by the server 74 an internet message alerting a supervisory staff person of an event of interest.

The first method 100 also includes the step of 122 transmitting by the supervisory controller 42 data regarding detected events of interest to a server 74 located remotely from the vehicle 22. As shown in FIG. 2, a supervisory alert module 162 within the supervisory controller 42 may perform this step, in total or in part. The supervisory alert module 162 may include hardware, software, or a combination thereof.

The first method 100 also includes the step of 124 monitoring by the server 74 the model parameters 58 from a plurality of different vehicles 22.

The first method 100 also includes the step of 126 identifying by the server 74 an abnormal model parameter 58 as a model parameter 58 having a value that is outside of a normal range of values when compared with similar model parameters 58 from other vehicles 22.

Figure 6:
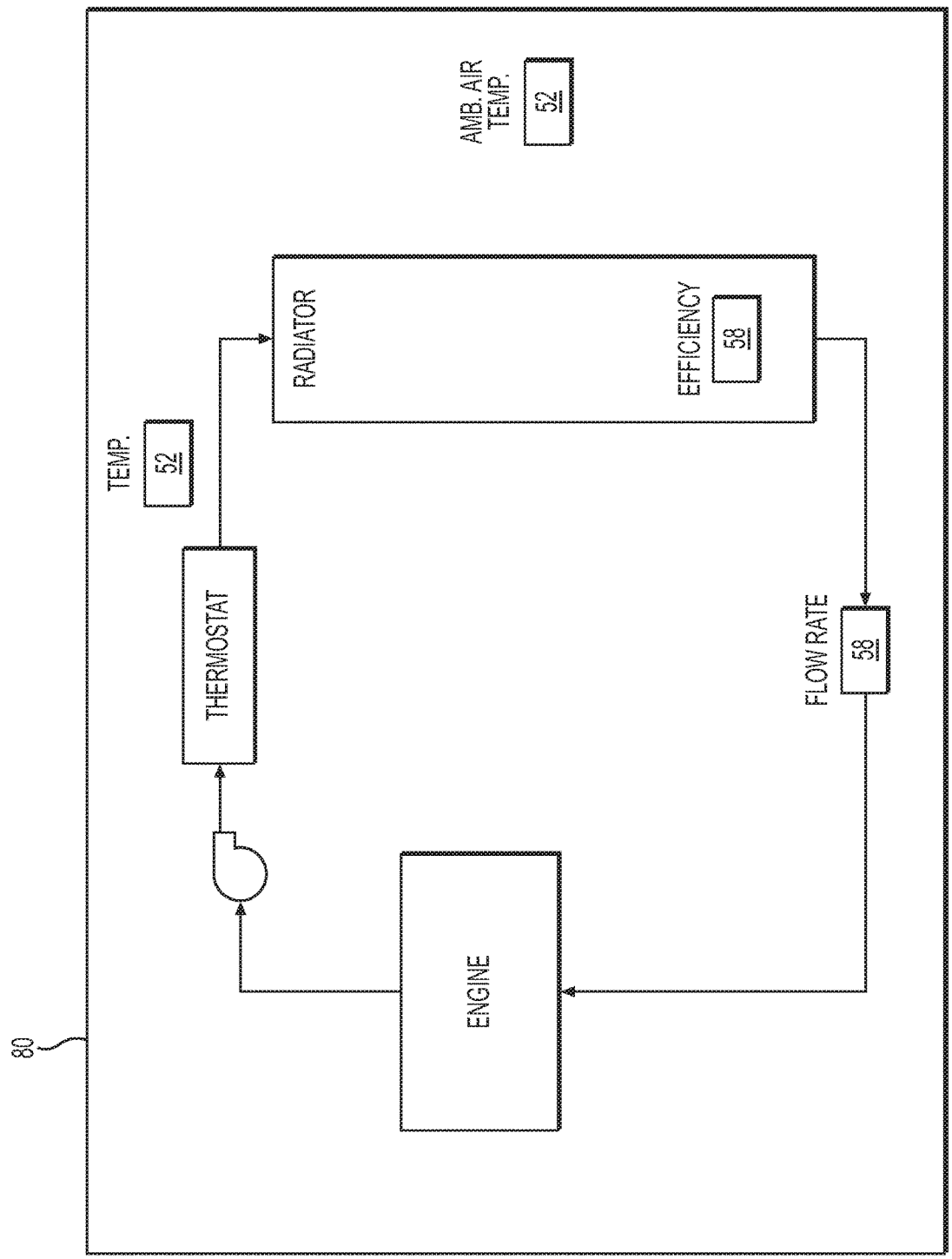
FIG. 6 is a block diagram of an example functional model of an engine cooling subsystem.

According to an aspect, the normal range values for identifying an abnormal model parameter 58 may be predetermined and static values. For example, in the functional model 80 of FIG. 6, showing an engine cooling subsystem, the model parameter model parameter 58 for the radiator efficiency may have a predetermined normal range of 50-100%. If that model parameter 58 is set for less than 50% or for greater than 100% efficient, the server 74 would identify that model parameter 58 as being an abnormal model parameter 58 Alternatively, the normal range values for identifying an abnormal model parameter 58 may be determined using statistical process control methods. For example, using the same radiator efficiency model parameter 58, slight variations of up to 3% may be typical across all similar functional models 80 observed by the server 74, and may result from normal wear and tear, or changes to the type of coolant used. The server may 74 may then automatically flag any variation in the radiator efficiency of more than 3% as being an abnormal model parameter 58.

The first method 100 may further include the optional step of 128 alerting a driver of the vehicle 22 of the occurrence of an abnormal model parameter 58 using a user signaling device 36. The first method 100 may also include the optional step of 130 generating and sending by the server 74 an internet message alerting a supervisory staff person of the occurrence of an abnormal model parameter 58.

The first method 100 may also include the step of 132 recalibrating the model parameter 58 by the supervisory controller 42 on a periodic basis to account for mechanical wear or other factors affecting the accuracy of the functional model 80 in simulating the physical system 24 within the vehicle 22. The new model parameter 58 may be generated directly by the supervisory controller 42. As shown in FIG. 2, a recalibration module 164 within the supervisory controller 42 may perform this step, in total or in part. The recalibration module 164 may include hardware, software, or a combination thereof. Alternatively, the new model parameter 58 may be provided to the supervisory controller 42 from the server 74.

The step of 132 recalibrating the model parameter 58 by the supervisory controller 42 on a periodic basis may further include the sub-steps of: 132A storing by the supervisory controller 42 a plurality of values of a given operational parameter 52 associated with the physical system 24 of the vehicle 22, and from different times, as historical data 50 within a data store 54 memory; 132B computing by the supervisory controller 42 an updated model parameter 58 which more accurately simulates one or more system state values corresponding to the given operational parameter 52 of the physical system 24 associated with the functional model 80 as compared with a corresponding system state value calculated using an existing model parameter 58; and 132C replacing the (existing) model parameter 58 with the updated model parameter 58.

The step of 132 recalibrating the model parameter 58 by the supervisory controller 42 on a periodic basis may alternatively or additionally include the sub-steps of: 132D storing by the server 74 historical model data of the model parameter 58 from a plurality of different functional models 80 from a plurality of different vehicles 22; 132E generating by the server 74 an updated model parameter 58 based upon the historical model data of the model parameters 58 from a plurality of different functional models 80; 132F sending the updated model parameter 58 from the server 74 to the supervisory controller 42; and 132G replacing the (existing) model parameter 58 with the updated model parameter 58.

Figure 10:
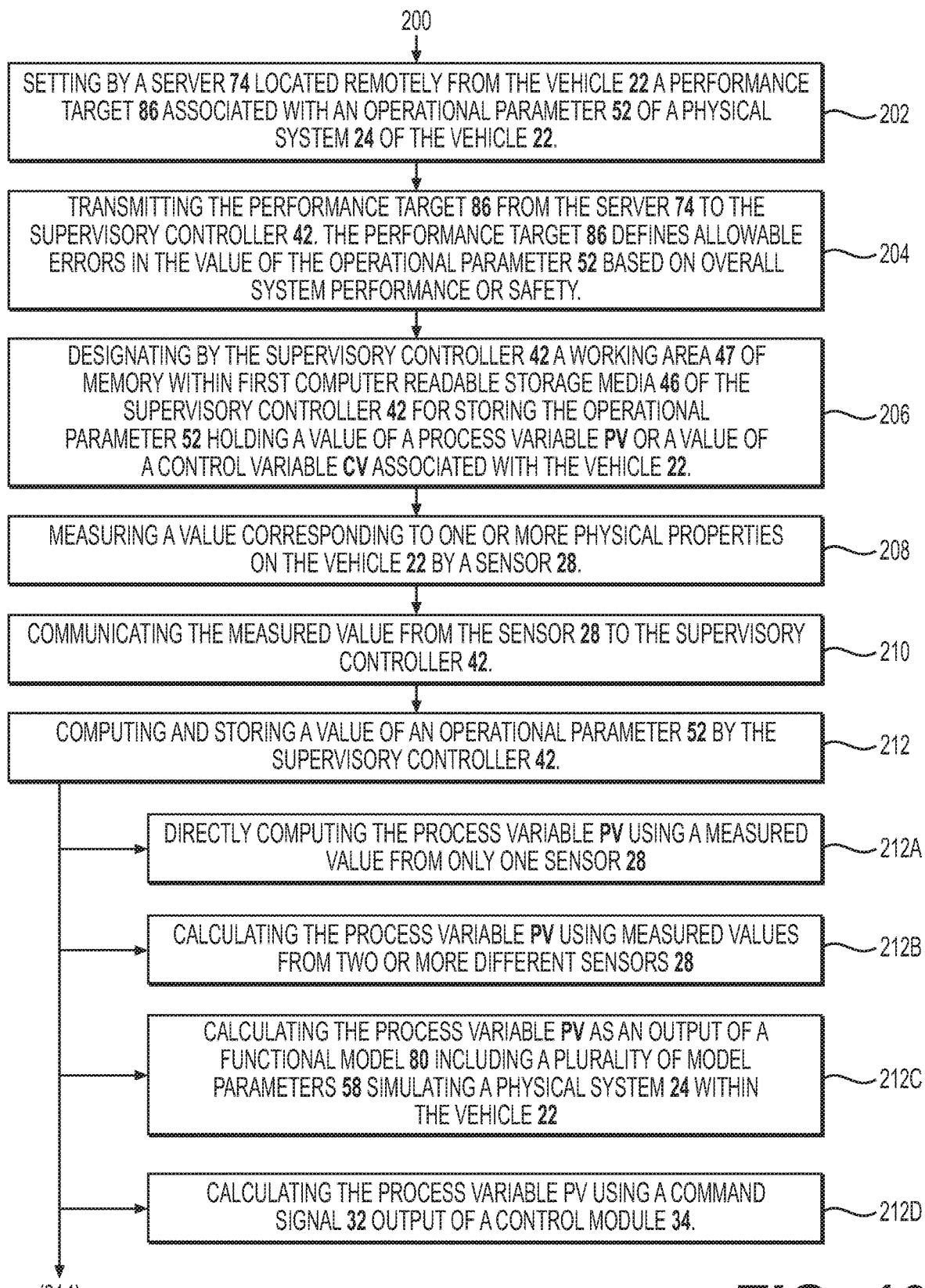
FIG. 10 is a flow chart illustrating method steps of an embodiment for monitoring and control of a vehicle according to an aspect of the disclosure.
Figure 11:
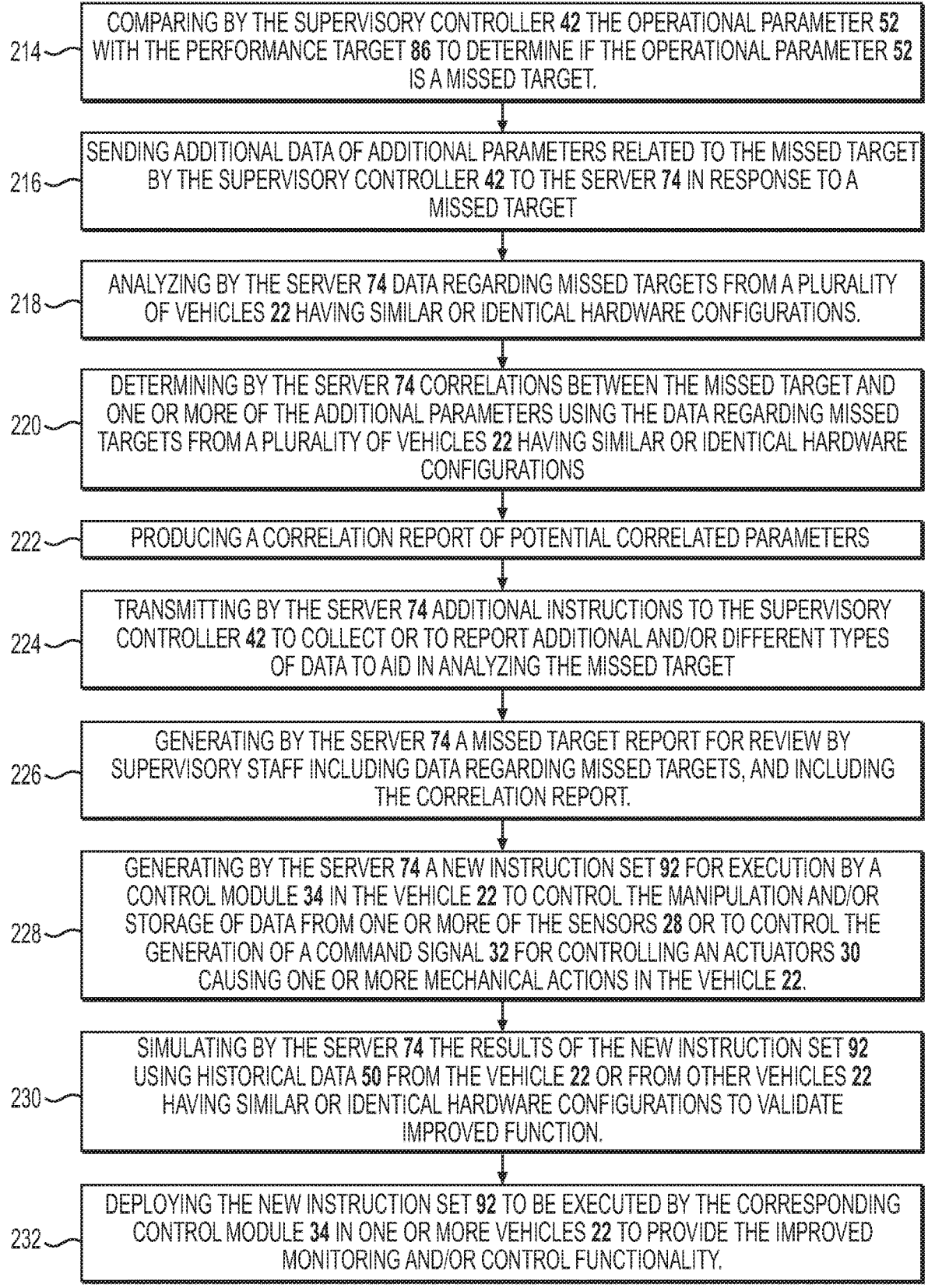
FIG. 11 is a flow chart illustrating method steps.

A second method 200 for monitoring and control of a vehicle 22 having a plurality of control modules 34 and a supervisory controller 42 is also provided. The second method 200 is described in the flow charts of FIGS. 10-11. The second method 200 includes the step of 202 setting by a server 74 located remotely from the vehicle 22 a performance target 86 associated with an operational parameter 52 of a physical system 24 of the vehicle 22.

Figure 5:
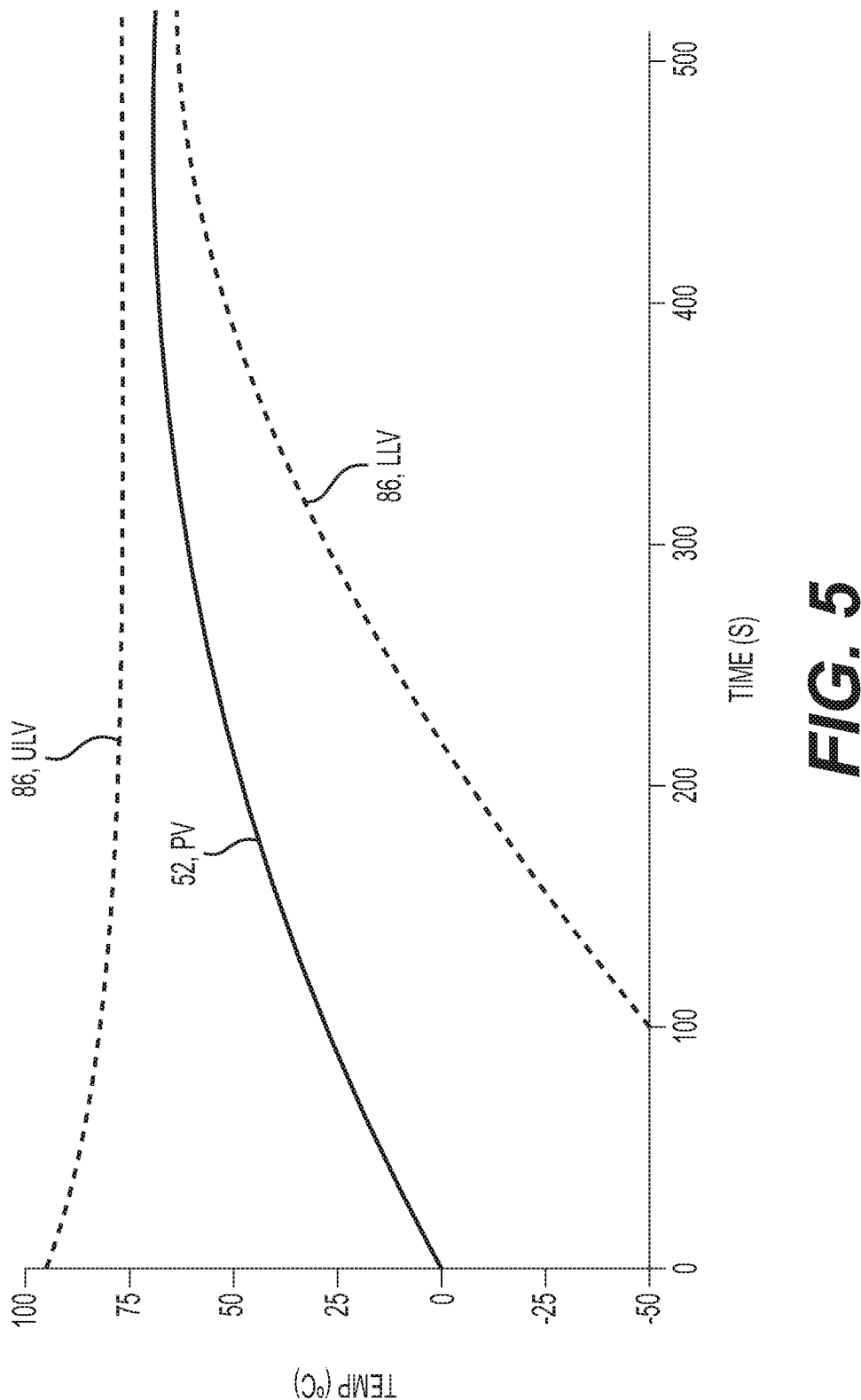
FIG. 5 is a graph of the value of an operational parameter of a vehicle over time.

The second method 200 includes the step of 204 transmitting the performance target 86 from the server 74 to the supervisory controller 42. The performance target 86 defines allowable errors in the value of the operational parameter 52 based on overall system performance or safety. The performance target 86 may include an upper limit value ULV and a lower limit value LLV, which may each vary over time For example, as shown in FIG. 5, the operational parameter 52 may be a process variable PV of a coolant temperature, which may have an upper limit value ULV and a lower limit value LLV that narrow over time. This narrowing may allow time for an engine to warm-up and to allow a wide range of temperatures at initial startup (time) to account for a wide range of ambient temperatures. The performance target 86 may then narrow-down to a smaller range of values as time goes on and the system moves toward a steady-state.

The second method 200 includes the step of 206 designating by the supervisory controller 42 a working area 47 of memory within first computer readable storage media 46 of the supervisory controller 42 for storing the operational parameter 52 holding a value of a process variable PV or a value of a control variable CV associated with the vehicle 22.

The second method 200 includes the step of 208 measuring a value corresponding to one or more physical properties on the vehicle 22 by a sensor 28.

The second method 200 includes the step of 210 communicating the measured value from the sensor 28 to the supervisory controller 42.

The second method 200 may include the step of 212 computing and storing a value of an operational parameter 52 by the supervisory controller 42. This step may include one or more of the sub-steps of: 212A directly computing the process variable PV using a measured value from only one sensor 28; 212B calculating the process variable PV using measured values from two or more different sensors 28; 212C calculating the process variable PV as an output of a functional model 80 including a plurality of model parameters 58 simulating a physical system 24 within the vehicle 22; or 212D calculating the process variable PV using a command signal 32 output of a control module 34.

The second method 200 also includes 214 comparing by the supervisory controller 42 the operational parameter 52 with the performance target 86 to determine if the operational parameter 52 is a missed target.

The second method 200 also includes 216 sending additional data of additional parameters related to the missed target by the supervisory controller 42 to the server 74 in response to a missed target. The additional parameters related to the missed target may include one or more of the following: measured or inferred operational parameters 52, data regarding operating conditions, driver identification, type of vehicle 22, location or route data, or any other potentially relevant data. The data regarding operating conditions may include terrain data, type and condition of the roadway, weather and/or other environmental data such as lighting conditions, humidity, visibility, etc. The additional data regarding the missed target may include values of other operational parameters 52 besides the operational parameter 52 associated with the missed target and within the same subsystem as the missed target. The additional data regarding the missed target may include model parameters 58 of a functional model 80 simulating the same physical system 24 as the missed target. The additional data may allow for a more detailed picture to be constructed, especially if combined with data from other vehicles, which may together aid in understanding the root causes leading to the missed target.

The second method 200 also includes 218 analyzing by the server 74 data regarding missed targets from a plurality of vehicles 22 having similar or identical hardware configurations. The data analyzed by the server 74 may include the value of the operational parameter 52, and any other related additional parameters. The server 74 may then be able to determine if the performance target 86 is unnecessarily narrow or if there is a systemic problem with that physical system. For example, if the server 74 shows voltage drifting out of specification in 25 out of 100 different 22 vehicles, each having a newly launched alternator design, it could be a sign of a normal drift or it could be cause for alarm. Either way, the system designers could have a chance to evaluate and to either modify the performance target 86 or to revise the design of the alternator. If it is determined that the design needs to be changed, such changes could be made at an earlier date within a production run as compared to traditional loss-based methods that only track such design errors that result in losses such as those that result in warranty claims.

The second method 200 also includes 220 determining by the server 74 correlations between the missed target and one or more of the additional parameters related to the missed target using the additional data regarding missed targets from a plurality of vehicles 22 having similar or identical hardware configurations, and 222 producing a correlation report of potential correlated parameters. According to an aspect, the performance target 86 may be set using a predetermined value. Alternatively, the performance target 86 may be set by the server 74 using one or more values of corresponding operational parameters 52 determined from a plurality of other vehicles 22. In other words, the server 74, by having access to data regarding missed targets from a plurality of different vehicles, may direct the supervisory controller 42 as to where, when, and how much data to collect and to store in order to troubleshoot and/or to forecast failures or potential problems. For example, if a particular engine design is determined to commonly suffer from leaking head gaskets, the server 74 may direct the supervisory controller 42 in vehicles 22 having that engine design to collect, process, and to store data of operating parameters 52 related to the head gaskets such as, for example, power per cylinder, and water jacket temperature.

The second method 200 may also include the step of 224 transmitting by the server 74 additional instructions to the supervisory controller 42 to collect or to report additional and/or different types of data to aid in analyzing the missed target. These additional instructions may take the form of an applet 96 including a series of computer instructions stored in the instruction memory 49 portion of the first computer readable storage media 46 for execution by the first processor 44 of the supervisory controller 42. In keeping with the example above, for a vehicle 22 having the particular engine design that commonly has leaking head gaskets, the supervisory controller 42 may be provided with an applet 96 that causes the supervisory controller 42 to store, process, and/or to communicate additional data of operating parameters 52 related to the head gaskets. This additional data could help to diagnose such a failure in that particular vehicle 22 and/or to determine a root cause of the problem.

The second method 200 may also include the step of 226 generating by the server 74 a missed target report for review by supervisory staff including data regarding missed targets, and including the correlation report.

The second method 200 may also include the step of 228 generating by the server 74 a new instruction set for execution by a control module 34 in the vehicle 22 to control the manipulation and/or storage of data from one or more of the sensors 28 or to control the generation of a command signal 32 for controlling an actuators 30 causing one or more mechanical actions in the vehicle 22.

In an example scenario, a manufacturer may be required to change operating parameters of a vehicle in order to meet government requirements for emissions. The manufacturer may use data collected regarding missed targets (e.g. indicating non-compliance with government requirements) to decide if the corresponding performance target 86 should be adjusted or if a mechanical fix is required or if possible, a software revision may be employed to cause the vehicle to use its hardware more appropriately to meet the compliance requirements. For example, if it is determined that a particulate filter in a diesel exhaust system needs to regenerate more often, but for a shorter period of time, the server may transmit a new instruction set for execution by an emissions control module 34 implement that revised control strategy. In another example, if it is determined that a significant number of vehicles having a given hardware configuration would benefit from the ability to revise one or more operating parameters in order to The second method 200 may also include the step of 230 simulating by the server 74 the results of the new instruction set using historical data 50 from the vehicle 22 or from other vehicles 22 having similar or identical hardware configurations to validate improved function.

The second method 200 may also include the step of 232 deploying the new instruction set to be executed by the corresponding control module 34 in one or more vehicles 22 to provide the improved monitoring and/or control functionality.

The second method 200 may thereby provide "watch the watcher" functionality. In other words, a closed-loop controller may include some limited ability to adjust its tuning in response to observed conditions. Historically, these observed conditions were limited to those that were available locally to that specific vehicle 22. However, the distributed system 20 of the present invention may allow for more broad adjustments based on observed operations from a plurality of different vehicles 22. For example, operational parameters 52 such as shift points in a transmission that are traditionally monitored and controlled by a transmission control module 34 may have the ability to be adjusted based on operating conditions within the vehicle 22 and within some predetermined bounds that are programmed at the factory. The subject distributed system 20 of the present invention may allow the predetermined bounds to be revised based on observations from a plurality of different vehicles 22 having a similar or identical transmission physical system 24.

According to an aspect, machine learning techniques may be applied to data from the plurality of different vehicles 22 in order to facilitate a search for root causes or for calculating improved control strategies for systems within a vehicle 22.

Figure 12:
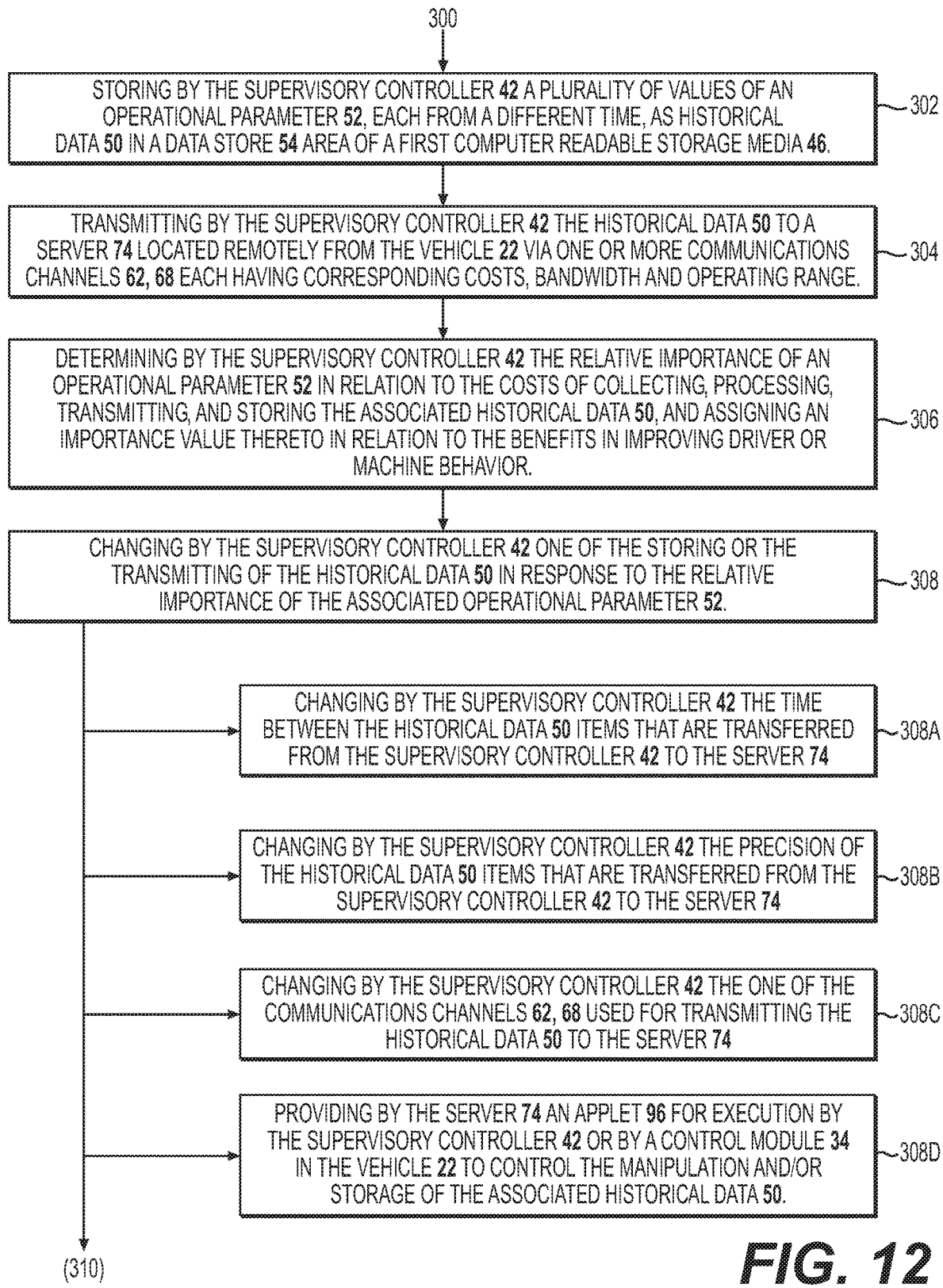
FIG. 12 is a flow chart illustrating method steps of an embodiment for monitoring and control of a vehicle according to an aspect of the disclosure.
Figure 13:
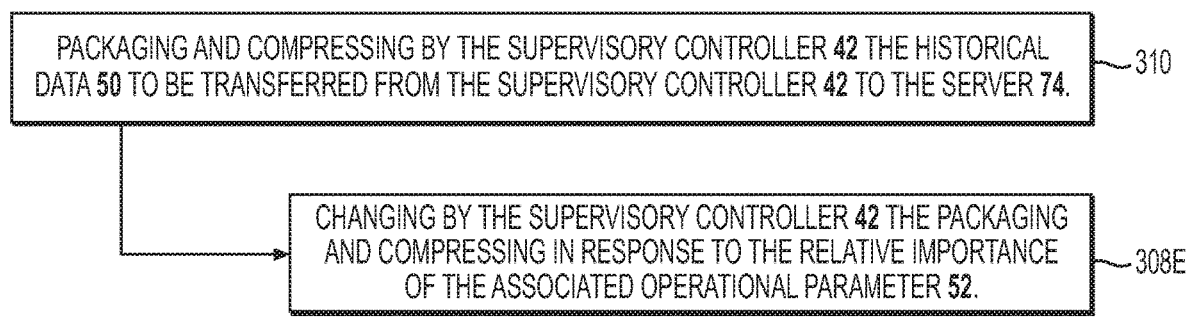
FIG. 13 is a flow chart illustrating method steps.

A third method 300 for distributed monitoring and control of a vehicle 22 having a plurality of control modules 34 and a supervisory controller 42 is also provided. The third method 300 is described in the flow charts of FIGS. 12-13. The third method 300 includes the step of 302 storing by the supervisory controller 42 a plurality of values of an operational parameter 52, each from a different time, as historical data 50 in a data store 54 area of a first computer readable storage media 46. In other words, the historical data 50 may include several values of one or more of the operational parameters 52, with each of the values having a corresponding time and date of recordation which may be stored as part of each item of historical data 50. The operational parameters 52 may be process variables PV, control variables CV, or a combination thereof and may be any include any or all of the information detailed above such as, for example, measurements from one or more sensors 28 or from a functional model 80 or from a controller output. The operational parameters 52 collected and stored may also include data regarding weather and other environmental factors such as lighting conditions, humidity, visibility, etc. that the vehicle 22 experiences, terrain and roadway data, and route data.

The third method 300 proceeds with the step of 304 transmitting by the supervisory controller 42 the historical data 50 to a server 74 located remotely from the vehicle 22 via one or more communications channels 62, 68 each having corresponding costs, bandwidth and operating range. As shown in FIG. 3, an output module 166 within the supervisory controller 42 may perform this step, in total or in part. The output module 166 may include hardware, software, or a combination thereof.

The third method 300 also includes 306 determining by the supervisory controller 42 the relative importance of an operational parameter 52 in relation to the costs of collecting, processing, transmitting, and storing the associated historical data 50, and assigning an importance value thereto in relation to the benefits in improving driver or machine behavior. The output module 166 within the supervisory controller 42 may also perform this step, in total or in part. According to an aspect, accounting-like methods may be employed in accomplishing step 306 determining by the supervisory controller 42 the relative importance of the operational parameter 52 associated with the vehicle 22. Such accounting-like methods may include using an optimal observer estimator or other methods such as cost-benefit analysis. Furthermore, non-linear valuations may be used for operational parameters 52 having unchanging high performance or for data having diminishing returns. For example, safety-related data may be categorically assigned high importance. High precision data may have diminishing returns. In other words, much of the data can be transmitted at a lower precision than is measured and used locally within the vehicle 22. For example, it may not be efficient to communicate very precise data on operating parameters such as roadway conditions, where low precision values are sufficient. The output module 166 within the supervisory controller 42 may also perform this step, in total or in part.

The third method 300 also includes 308 changing by the supervisory controller 42 one of the storing or the transmitting of the historical data 50 in response to the relative importance of the associated operational parameter 52. The output module 166 within the supervisory controller 42 may also perform this step, in total or in part. According to an aspect, this step may include one or more of the sub-steps of: 308A changing by the supervisory controller 42 the time between the historical data 50 items that are transferred from the supervisory controller 42 to the server 74. This may include changing the time intervals between historical data 50 items that are stored or changing the time intervals between historical data 50 items that are transmitted. Step 308 may also include the sub-steps of: 308B changing by the supervisory controller 42 the precision of the historical data 50 items that are transferred from the supervisory controller 42 to the server 74; or 308C changing by the supervisory controller 42 the one of the communications channels 62, 68 used for transmitting the historical data 50 to the server 74; or 308D providing by the server 74 an applet 96 for execution by the supervisory controller 42 or by a control module 34 in the vehicle 22 to control the manipulation and/or storage of the associated historical data 50. The applet 96 may, for example, take the form of a series of computer instructions stored in the instruction memory 49 portion of the first computer readable storage media 46 for execution by the first processor 44 of the supervisory controller 42.

The third method 300 may also include 310 packaging and compressing by the supervisory controller 42 the historical data 50 to be transferred from the supervisory controller 42 to the server 74. This step may include sending only the model parameters 58 and a small number of operational parameters 52 needed for the server 74 to reconstruct the historical data 50. The server may then 74 tune different unknown portions of the model until the known parameters match the observed operational parameter 52 values. This may, therefore allow for a large savings in data transferred when compared with prior art methods that send the large volumes of historical data 50 directly. The output module 166 within the supervisory controller 42 may also perform this step, in total or in part. If this optional step is performed, step 308 may include an additional sub-step 308E changing by the supervisory controller 42 the packaging and compressing in response to the relative importance of the associated operational parameter 52.

According to an aspect, a more complete picture of the performance of a given vehicle 22 may be generated by combining weather and other environmental data with data of operational parameters 52 from that vehicle. For example, a vehicle 22 that is regularly operated under extreme temperatures may be scheduled for more regular maintenance. Also, a more complete picture of the performance of a given vehicle 22 may be generated by combining roadway, terrain, and route data with data of operational parameters 52 from that vehicle. For example, a vehicle 22 that is regularly driven on uneven or rough road conditions may be flagged for more regular inspections or replacement of suspension and chassis components that tend to wear more quickly under those conditions. Such forecasting may be dynamically revised if the operation of the vehicle 22 changes such that it no longer regularly encounters those types of extreme conditions or particularly rough or uneven road conditions.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

Obviously, many modifications and variations of the present invention are possible in light of the above teachings and may be practiced otherwise than as specifically described while within the scope of the appended claims.

What is claimed is:

1. A method for monitoring and control of a vehicle including: providing a functional model including a model parameter and a plurality of system state values to simulate a physical system within the vehicle; wherein the system state values include at least one operational parameter associated with the physical system within the vehicle; calibrating the model parameter by a supervisory controller using measured values from one or more sensors; wherein the supervisory controller is located within the vehicle; storing the model parameter in a model store area of memory within a first computer readable storage media of the supervisory controller located in the vehicle; characterizing functional details of a current system state of the physical system within the vehicle by the supervisory controller using the model parameter and at least one of the operational parameters of the physical system; predicting future states of the physical system within the vehicle by the supervisory controller using the model parameter and measured values from one or more sensors; estimating by the supervisory controller one of the system state values of the physical system and not directly measured by any of the one or more sensors using the model parameter together with at least one operational parameter of the physical system; detecting events of interest by the supervisory controller within the system state values of the functional model; and transmitting by the supervisory controller data regarding detected events of interest to a server located remotely from the vehicle.

2. The method for monitoring and control of a vehicle as set forth in claim 1 wherein the functional model includes a plurality of two or more model parameters.

3. The method for monitoring and control of a vehicle as set forth in claim 1 further comprising using an initial calibration value for the model parameter prior to completion of the step of calibrating the model parameter by the supervisory controller using measured values from one or more sensors.

4. The method for monitoring and control of a vehicle as set forth in claim 1 wherein the step of detecting events of interest by the supervisory controller within the system states of the functional model includes comparing one of the system state values within the functional model against a predetermined threshold value.

5. The method for monitoring and control of a vehicle as set forth in claim 1 wherein the step of detecting events of interest by the supervisory controller includes using a statistical process control method to detect one of the system state values trending in a fashion that is not characteristic of normal operation.

6. The method for monitoring and control of a vehicle as set forth in claim 1 further including recalibrating the model parameter by the supervisory controller on a periodic basis to account for mechanical wear or other factors affecting the accuracy of the functional model in simulating the physical system within the vehicle.

7. The method for monitoring and control of a vehicle as set forth in claim 6 wherein the step of recalibrating the model parameter by the supervisory controller on a periodic basis includes using new model parameters generated by the supervisory controller.

8. The method for monitoring and control of a vehicle as set forth in claim 6 wherein the step of recalibrating the model parameter by the supervisory controller on a periodic basis includes using new model parameters provided from the server.

9. The method for monitoring and control of a vehicle as set forth in claim 6 wherein the step of recalibrating the model parameter by the supervisory controller on a periodic basis further includes: storing by the supervisory controller a plurality of values of a given operational parameter associated with the physical system of the vehicle, and from different times, as historical data within a data store memory; computing by the supervisory controller an updated model parameter which more accurately simulates one or more system state values corresponding to the given operational parameter of the physical system associated with the functional model as compared with a corresponding system state value calculated using an existing model parameter; and replacing the model parameter with the updated model parameter.

10. The method for monitoring and control of a vehicle as set forth in claim 6 wherein the step of recalibrating the model parameter by the supervisory controller on a periodic basis further includes: storing by the server historical model data of the model parameter from a plurality of different functional models from a plurality of different vehicles; generating by the server an updated model parameter based upon the historical model data of the model parameter from a plurality of different functional models; sending the updated model parameter from the server to the supervisory controller; and replacing the model parameter with the updated model parameter.

11. The method for monitoring and control of a vehicle as set forth in claim 1 further including the step of alerting a driver of the vehicle of the occurrence of an event of interest using a user signaling device.

12. The method for monitoring and control of a vehicle as set forth in claim 1 further including the step of generating and sending by the server an internet message alerting a supervisory staff person of an event of interest.

13. The method for monitoring and control of a vehicle as set forth in claim 1 further including the step of monitoring by the server the model parameters from a plurality of different vehicles; and identifying by the server an abnormal model parameter as a model parameter having a value that is outside of a normal range of values when compared with similar model parameters from other vehicles.

14. The method for monitoring and control of a vehicle as set forth in claim 13 wherein the normal range values for identifying an abnormal model parameter are predetermined and static values.

15. The method for monitoring and control of a vehicle as set forth in claim 13 wherein the normal range values for identifying an abnormal model parameter are determined using statistical process control methods.

16. The method for monitoring and control of a vehicle as set forth in claim 13 further including the step of alerting a driver of the vehicle of the occurrence of an abnormal model parameter using a user signaling device.

17. The method for monitoring and control of a vehicle as set forth in claim 13 further including the step of generating and sending by the server an internet message alerting a supervisory staff person of the occurrence of an abnormal model parameter.

18. A method for monitoring and control of a vehicle having a plurality of control modules and a supervisory controller, said method including: setting by a server located remotely from the vehicle a performance target associated with an operational parameter of a physical system of the vehicle; transmitting the performance target from the server to the supervisory controller; wherein the performance target defines allowable errors in a value of the operational parameter based on overall system performance or safety; designating by the supervisory controller a working area of memory within a first computer readable storage media of the supervisory controller for storing the operational parameter holding a value of a process variable or a value of a control variable associated with the vehicle; comparing by the supervisory controller the operational parameter with the performance target to determine if the operational parameter is a missed target; sending additional data of additional parameters related to the missed target by the supervisory controller to the server in response to a missed target; wherein the additional parameters related to the missed target includes measured or inferred operational parameters, operating conditions, driver identification, type of vehicle, location or route data; analyzing by the server data regarding missed targets from a plurality of vehicles having similar or identical hardware configurations; and determining by the server correlations between the missed target and one or more of the additional parameters related to the missed target using the additional data regarding missed targets from a plurality of vehicles having similar or identical hardware configurations, and producing a correlation report of potential correlated parameters.

19. The method for monitoring and control of a vehicle as set claim 18 wherein the performance target is set using a predetermined value.

20. A method for distributed monitoring and control of a vehicle having a plurality of control modules and a supervisory controller, said method including: storing by the supervisory controller a plurality of operational parameter values, each from a different time, as historical data in a data store area of a first computer readable storage media; transmitting by the supervisory controller, the historical data to a server located remotely from the vehicle via one or more communications channels each having corresponding costs, bandwidth and operating range; determining by the supervisory controller the relative importance of an operational parameter in relation to the costs of collecting, processing, transmitting, and storing the associated historical data, and assigning an importance value thereto in relation to the benefits in improving driver or machine behavior; and changing by the supervisory controller one of the storing or the transmitting of the historical data in response to the relative importance of the associated operational parameter.

* * * * *